United States Patent [19]

Thuries et al.

[11] Patent Number: 5,117,701
[45] Date of Patent: Jun. 2, 1992

[54] SCREW-AND NUT TYPE MEMBER FOR TRANSMITTING ROTARY MOTION

[75] Inventors: Edmond Thuries, Meyzieu; Jean-Paul Masson, Villeurbanne; Roger Goutte, Lyon, all of France

[73] Assignee: GEC Alsthom SA, Paris, France

[21] Appl. No.: 653,524

[22] Filed: Feb. 11, 1991

[51] Int. Cl.$^5$ ............... F16H 29/20; F16H 1/20; G05G 5/00

[52] U.S. Cl. ............... 74/89.15; 74/424.8 R; 74/424.8 B; 74/625; 192/141; 70/181; 70/212

[58] Field of Search ............... 74/625, 424.8 B, 89.15, 74/424.8 R, 459; 192/141; 70/212, 181

[56] References Cited

U.S. PATENT DOCUMENTS

| | | | |
|---|---|---|---|
| 1,383,781 | 7/1921 | Ball | 70/212 X |
| 1,446,610 | 2/1923 | Bell | 70/181 X |
| 2,709,062 | 5/1955 | Lamb | 74/625 X |
| 3,120,845 | 2/1964 | Horner | 74/625 X |
| 3,293,925 | 12/1966 | Linsley | 192/141 X |
| 3,537,666 | 11/1970 | Lewis | 74/89.15 |
| 3,656,358 | 4/1972 | Kopp | 74/89.15 |
| 3,731,546 | 5/1973 | MacDonald | 74/89.15 X |
| 3,826,153 | 7/1974 | Sheppard | 74/459 |
| 4,137,784 | 2/1979 | Griffin | 74/89.15 |
| 4,266,437 | 5/1981 | Obergfell | 74/89.15 X |
| 4,396,813 | 8/1983 | Hesselbart et al. | 192/141 X |
| 4,440,050 | 4/1984 | Kagerer | 74/625 X |
| 4,593,576 | 6/1986 | Schindel | 74/424.8 B |
| 4,838,403 | 6/1989 | Layer | 192/141 |

FOREIGN PATENT DOCUMENTS

| | | | |
|---|---|---|---|
| 70435 | 6/1915 | Austria | 192/141 |
| 614654 | 9/1926 | France . | |
| 1328909 | 4/1963 | France . | |
| 2584790 | 1/1987 | France . | |
| 857203 | 12/1960 | United Kingdom | 74/424.8 B |
| 2060445 | 5/1981 | United Kingdom | 74/625 |

Primary Examiner—Allan D. Herrmann
Assistant Examiner—Julie Krolikowski
Attorney, Agent, or Firm—Sughrue, Mion, Zinn Macpeak & Seas

[57] ABSTRACT

A transmission member includes a driving shaft (60) actuated by a control shaft (9), and a driven shaft (3) driven in rotation by a plate (61) provided with a driving thread and a driven thread. The driving shaft is provided with a thread that engages in the driving thread of the plate and the driven shaft is provided with a thread that engages in the driven thread of the plate.

8 Claims, 3 Drawing Sheets

_5,117,701_

SCREW-AND NUT TYPE MEMBER FOR TRANSMITTING ROTARY MOTION

FIELD OF THE INVENTION

The present invention relates to a member for transmitting rotary motion.

BACKGROUND OF THE INVENTION

Mechanical devices for transmitting rotary motion from a driving shaft to a driven shaft are generally constituted on the basis of a gear train, a chain mechanism, or a screw and wheel system such as a worm gear. These devices include a large number of parts, particularly if certain additional characteristics are looked for, e.g. irreversibility (motion cannot be transmitted from the driven shaft to the driving shaft) or end-of-stroke indication (for motion over a limited stroke). Such characteristics are looked for, for example, in devices for controlling an electrical section switch.

An object of the present invention is thus to provide a member for transmitting rotary motion, which member is very simple mechanically, including a small number of parts, enabling irreversibility to be obtained without additional parts, and easily receiving an end-of-stroke indication.

SUMMARY OF THE INVENTION

The present invention provides a transmission member for transmitting rotary motion, the member comprising a driving shaft integral with and actuated by a control shaft, a driven shaft rotated by said driving shaft, and a plate provided with a driving thread and a driven thread, said driving shaft being provided with a thread engaged in said driving thread, and said driven shaft being provided with a thread engaged in said driven thread, the transmission member being characterized in that said driving shaft is a hollow shaft, said plate is a disk including a thread on its periphery which engages in said hollow shaft and an inside thread centered on its axis which engages on said driven shaft.

In addition, in the member for transmitting rotary motion, said control shaft is actuated either by a handle or else by a motor.

Further, in the member for transmitting rotary motion, the materials of the driving shaft and of the driving thread, and the thread pitch of these two items define an irreversible thread.

Advantageously, if at least a portion of the energy provided by the driven shaft in the member for transmitting rotary motion is used to displace a load, then the member includes a balancing mass fixed to the disk, with the vertical components of the displacements of this load and of this balancing mass being in opposite directions.

In a preferred embodiment, the member for transmitting rotary motion includes a small column parallel to the shafts and movable in translation, the column carrying a latch, the control shaft is provided with a rod extending perpendicularly thereto, and the transmission member includes means for causing said rod to come into abutment against said latch when the disk is at the end of its stroke.

In addition, the member for transmitting rotary motion includes a control strip actuated by a handle, said handle acting via its end on a switch, said control strip taking up three positions, in which:

the switch delivers a switch signal suitable for enabling power to be applied to the motor, and the control strip prevents the handle being coupled to the control shaft;

the switch prevents power being applied to the motor, and the control strip enables the handle to be coupled to the control shaft; and the switch prevents power being applied to the motor, the control strip prevents the handle being coupled to the control shaft, and means enable said control strip to be locked in said position.

In addition, the member for transmitting rotary motion is characterized in that said small column is terminated by a finger which engages in holes in the control strip, said finger preventing said control strip being moved unless said disk is at the end of its stroke.

Finally, the member for transmitting rotary motion includes a high end-of-stroke contact and a low end-of-stroke contact respectively delivering a disk high signal and a disk low signal when actuated by the disk, and a control unit receiving the disk high signal and the disk low signal and the switch signal, and providing the energy required to operate the motor via a power connection and for defining its direction of rotation whenever it also receives a control signal.

BRIEF DESCRIPTION OF THE DRAWING

The various objects and characteristics of the invention are now described in greater detail in the context of embodiment given by way of non-limiting example and with reference to accompanying figures, in which.

DESCRIPTION OF THE PREFERRED EMBODIMENTS

For clarity below, the terms "up" and "down", and terms having similar meanings such as "rising" and "falling" are used in the description to define the disposition of the various items in FIGS. 1 and 3 where the transmission member is shown in a vertical position. However, they do not imply in any way that the member must necessarily be used in this position. Without going beyond the scope of the invention, it may be installed in an arbitrary orientation.

Figure 1:
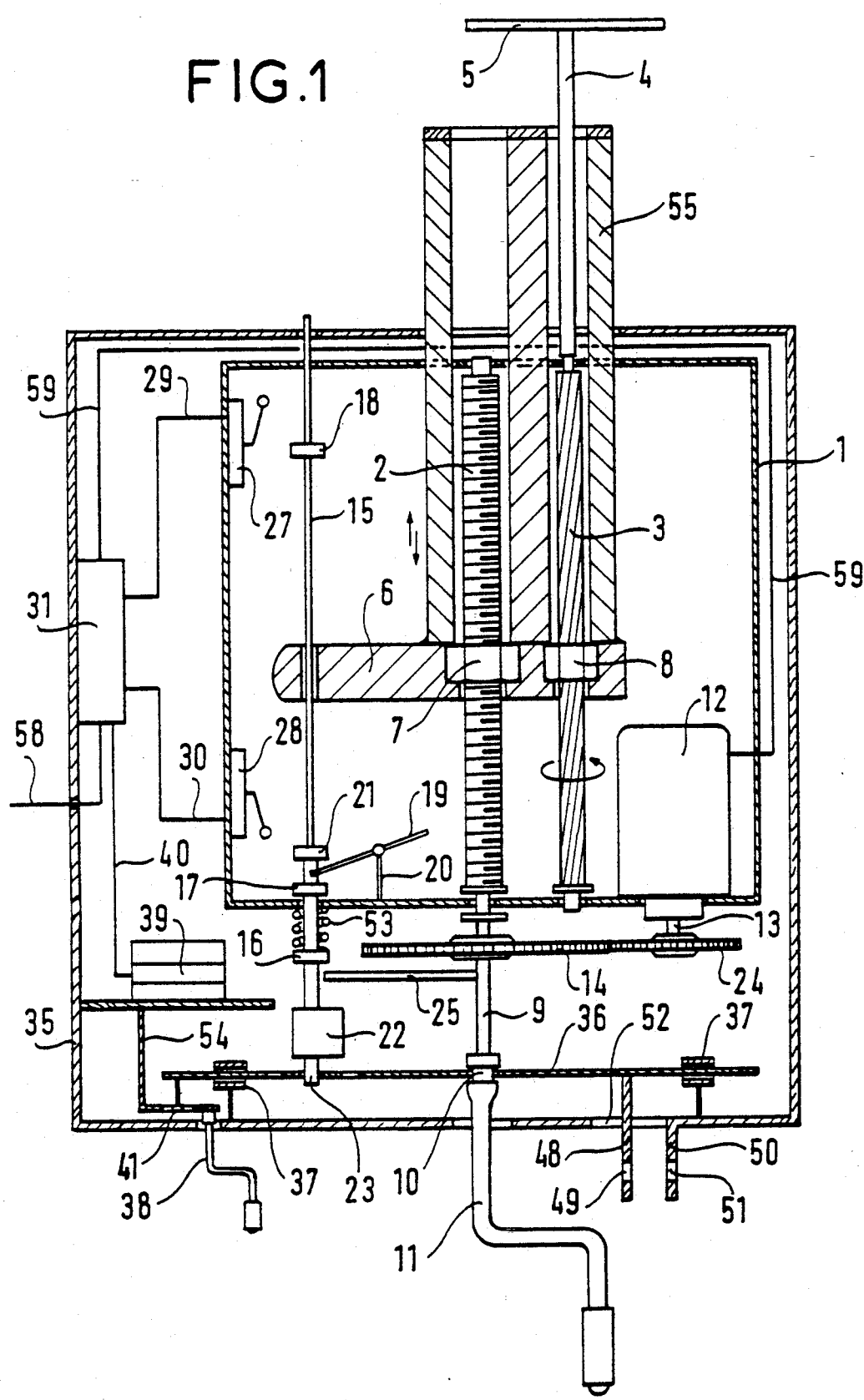
FIG. 1 is a section view through a member of the invention for transmitting rotary motion.

The member for transmitting rotary motion shown in FIG. 1 comprises a frame 1 on which a driving shaft 2 is maintained that is capable of rotating about its axis and that is prevented from moving in translation. A driven shaft 3 held in the same manner is disposed parallel to said driving shaft 2. The driven shaft includes a length which is contained within the frame 1 like the driving shaft, and it is extended by a section 4 which is terminated by a coupling member 5 for providing mechanical coupling with an external device. The driving shaft and the driven shaft are provided with threads over at least a portion of their respective lengths (their entire lengths in the figure) and the pitches thereof are referred to respectively as the driving pitch and as the driven pitch.

The member for transmitting rotary motion also includes a plate 6 surrounding both shafts and having fixed thereon a first nut, namely a "driving" nut 7, which engages the threaded portion of the driving shaft, and a second nut, namely a "driven" nut 8, which engages the driven shaft.

The thread of the driven shaft 3 is reversible, i.e. when the driven nut is prevented from rotating, rotation of the shaft causes translation of the nut, and vice versa, it is possible to move the nut in translation, thereby rotating the shaft. The conditions required for reversibility are known and specify a minimum thread pitch as a function of the coefficient of friction between the materials of the nut and the shaft.

Thus, when the driving shaft 2 is rotating, it imparts translation motion to the plate 6 via the driving nut 7, and this plate imparts rotary motion to the driven shaft 3 by displacing the driven nut 8 in translation. The angles through which the two shafts rotate are in inverse ratio to their pitches. The threaded portions of the two shafts must allow the plate 6 to travel freely. They must therefore correspond to each other. The stroke of the plate 6 defines the amplitude of rotation possible for each of the shafts.

It may be observed that operation of the device does not require the thread on the driving shaft 2 to be reversible, all that is required is that motion of the driving shaft should be transmitted to the driven shaft. In addition, in some applications where it is required, irreversibility (the impossibility of acting on the driven shaft) may be provided by making the thread of the driving shaft irreversible.

The driving shaft 2 is extended by a control shaft 9 to which it is fixed. This control shaft is terminated by a coupling which may receive a control member 11 such as a handle. It may also be actuated by an electric motor 12 whose outlet shaft 13 is mechanically coupled thereto by any conventional transmission system, e.g. a train of gears 14 and 24.

The member for transmitting rotary motion also includes a small column 15 maintained on the frame 1 in such a manner as to be parallel to the two shafts 2 and 3 and to be capable of performing translation along its own axis. This translation is limited in the upwards direction by an abutment 16 which comes into abutment against the frame 1, and in the downwards direction by an abutment 17 which also comes into abutment against the frame. The small column 15 also serves as a guide for the plate 6 which has an opening to through the plate enable the plate to slide therealong. The small column also includes an abutment 18 which is entrained by the upwardly-moving plate 6. A device likewise actuated by the plate comprises a lever 19 capable of pivoting about a horizontal axis, said axis being fixed to a stand 20 which is in turn fixed to the frame 1. One end of this lever engages beneath an abutment 21 fixed to the small column 15, while the other end of this lever is situated higher than the abutment 21 when the small column is bearing against its abutment 17. Thus, during downwards motion, the plate 6 will engage the lever 19, thereby tending to raise the column 15 by action via lever engagement with the abutment 21. It may be observed that the abutment 18 and the lever 19 have the same function, namely causing the small column to rise.

When its own weight is not sufficient to return the small column 15 naturally into engagement against its abutment 17, then a spring 53 is interposed between the frame 1 and the abutment 16.

This small column 15 is also provided with a latch 22, a mechanical abutment situated beneath the abutment 16. It is terminated by a finger 23 at its bottom end. It is necessary to have a rod 25 fixed perpendicularly to the control shaft 9 and disposed above the latch 22 when the small column 15 is bearing against the abutment 17. The length of the rod 25 is greater than the gap between the latch 22 and the control shaft 9. Thus, action of the plate 6 on the abutment 18 or on the lever 19 lifts the small column 15 until the rod 25 comes into abutment against the latch 22, thereby preventing the control shaft 9 from rotating. The system is configured in such a manner that the control shaft is locked by the rod 25 before:

the abutment 18 comes into contact with the frame 1;
the plate 6 comes into contact with the abutment 21; or
the abutment 16 comes into contact with the frame 1.

Means are thus defined to limit the stroke of the plate 6.

The member for transmitting rotary motion also includes a top end-of-stroke contact 27 and a bottom end-of-stroke contact 28 each of which is actuated by the plate 6 when in its top or bottom position and which respectively transmit a high plate signal 29 and a low plate signal 30 to a control unit 31 when they are engaged. The operation of the control unit is described in greater detail below.

The member for transmitting rotary motion is supported by a support frame 35 which supports the various different component parts thereof. It includes a control strip 36 capable of sliding in slideways 37 fixed to the support frame 35. The control strip is moved in translation by a lever type handle 38. This handle also acts on a switch 39 which provides a switch signal 40 to the control unit.

Figure 2A:
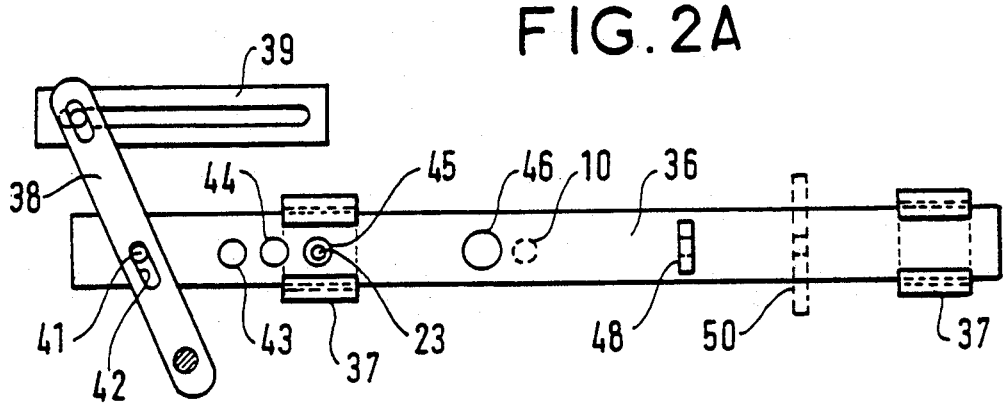
FIGS. 2A, 2B, and 2C are three views corresponding to three different positions of a control strip defined in the context of the invention.
Figure 2B:
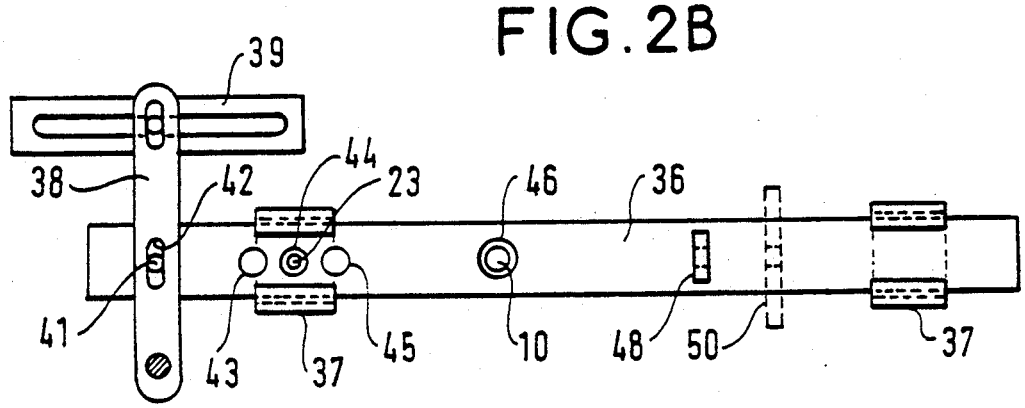
Figure 2C:
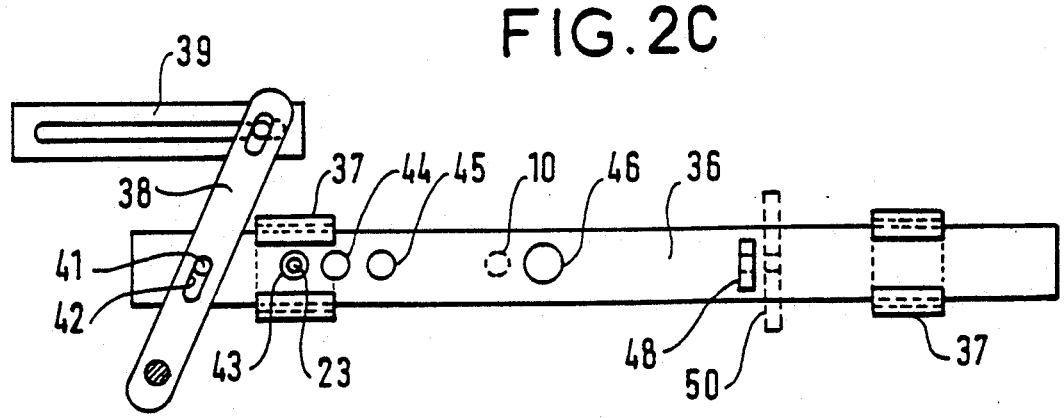

The control strip 36 appears more clearly in FIG. 2. It includes a peg 41 engaged in an oblong opening 42 in the control handle 38. It also includes three holes 43, 44, and 45 into which the finger 23 of the small column 15 may be inserted. It includes an opening 46 capable of revealing the coupling 10 on the control shaft 9. Finally, it includes a tab 48 pierced by an opening 49. The strip may take up three positions as shown in FIGS. 2A, 2B, and 2C which are defined by the finger 23 coming into coincidence with respective ones of the holes 45, 44, and 43.

The support frame 35 supports the rotary shaft of the control handle 38. It includes a tab 50 pierced by an opening 51 whose axis coincides with that of the opening 49, and it also has a slot 52 enabling the tab 48 to move between the two end positions of the control strip 48.

The control handle 38 which acts via its end 54 on the switch 39 enables the following three configurations to be obtained when the plate 6 is at the end of its stroke (with the finger 23 disengaged from the control strip):

Configuration A (FIG. 2A), electrical operation

The finger 23 is opposite the hole 45, the switch 39 is in its working position (it allows power to be fed to the motor 12), the opening 46 does not coincide with the coupling 10 (the handle 11 cannot be inserted), and the tab 48 of the control strip is not in the proximity of the tab 50 on the support frame.

Configuration B (FIG. 2B), manual operation

The finger 23 faces the hole 44, the switch 39 is in its rest position (power cannot be fed to the motor 12), the opening 46 coincides with the coupling 10 (the handle 11 may be inserted therein), and the tab 48 of the control strip is not in the proximity of the tab 50 of the support frame.

Configuration C (FIG. 2C), system locked and no operation possible

The finger 23 faces the hole 43, the switch 39 is in its rest position, the opening 46 does not coincide with the coupling 10, the tabs 48 and 50 of the control strip and of the support frame are in the immediate proximity of each other, thus making it possible to connect them together using a padlock to prevent the control strip 36 being moved.

In FIG. 1, the control strip 36 is shown in configuration B, and reference is made again to FIG. 1 in the description below.

The control unit 31 is activated only in configuration A. In this case, it receives the switch signal 40 from the switch 39 which is in its working position. If it also receives a control signal 58, then it delivers power to the motor 12 to enable it to operate together with information concerning its direction of rotation via a power connection 59.

The direction of rotation information is derived from the plate high signal 29 and the plate low signal 30.

The control unit 31 is implemented using an electrical circuit which satisfies conventional standards such as protection by means of a thermal relay, a no-voltage relay, etc.

In some applications, the member for transmitting rotary motion is used, at least in part, to raise or lower a load.

It is then disposed in a substantially vertical disposition, either in the sense shown in FIG. 1, or in the opposite sense.

It includes a balance mass 55, FIG. 1, which is fixed to the plate 6. The dimensions of the balance mass depend on the load to be displaced. The threads of the driving shaft 2 and of the driven shaft 3 are designed so that raising a load corresponds to lowering the plate 6 and, vice versa, lowering a load corresponds to raising the plate 6. The force that needs to be applied to the control shaft 9 is correspondingly reduced.

Figure 3:
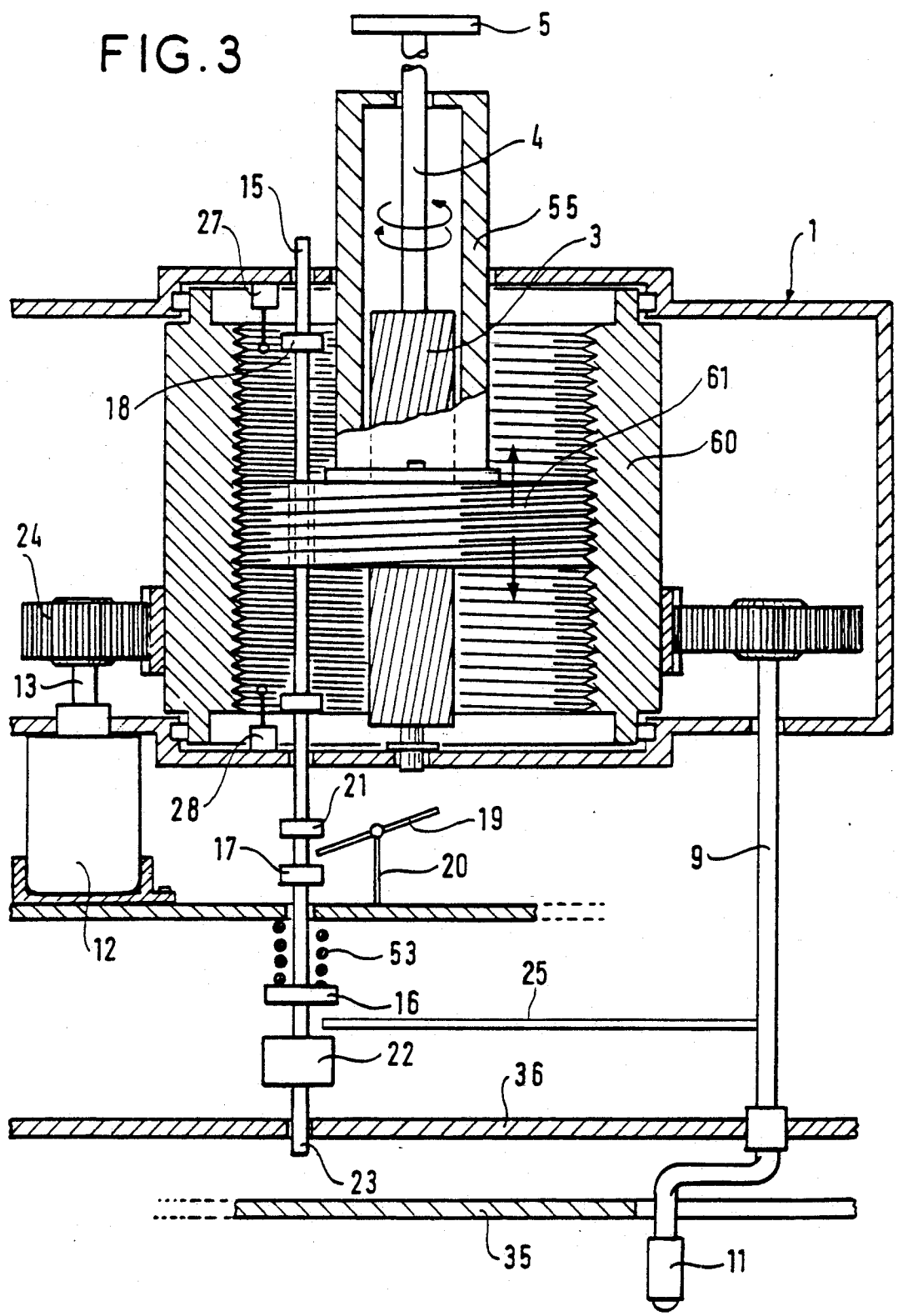
FIG. 3 shows a preferred embodiment of a member for transmitting rotary motion.

In a preferred embodiment of the member for transmitting rotary motion shown in part in FIG. 3, the essential features of the above considerations apply. In order to improve clarity in the figure, only some of the components have been shown even though the invention is fully applied.

The driving shaft 2 is replaced in this case by a hollow shaft 60 which is threaded on its inside wall at a pitch corresponding to the driving pitch. The plate 6 which was arbitrary in shape is now replaced by a disk 61. The periphery of this disk is threaded and it engages in matching threads the hollow shaft 60 thus constituting means equivalent to the association of the driving shaft 2 and the driving nut 7. The disk 61 is also provided with an internal thread centered on its axis of symmetry which is engaged on the periphery of the driven shaft 3, which represents means equivalent to the associated driven nut 8 and driven shaft 3. The disk also includes an opening to enable it to slide along the small column 15 which is located in this case between the shafts 3 and 61. The top end-of-stroke contact 27 and the bottom end-of-stroke contact 26 can also be seen which are fixed in this case between the two shafts on planes perpendicular to the axes of these shafts. The remainder of the device is implemented as described above.

In the various embodiments of the invention, the driven shaft 3 is advantageously implemented with a thread that is fitted with balls.

The member for transmitting rotary motion is particularly applicable in the implementation of a device for controlling an electrical section switch. In this case, the coupling plate 5 is fixed to the drive member of a section switch, e.g. an insulating column.

We claim:

1. A transmission member for transmitting rotary motion, the member comprising a driving shaft integral with and actuated by a control shaft, a driven shaft rotated by said driving shaft, and a plate provided with a driving thread and a driven thread, said driving shaft being provided with a thread engaged with said driving thread, and said driven shaft being provided with a thread engaged with said driven thread, the transmission member being characterized in that said driving shaft is a hollow shaft (60), said plate is a disk (61) including a thread on its periphery which lies internally of said hollow shaft (60) and said disk having an inside thread centered on its axis which engages a thread on said driven shaft (3).

2. A member for transmitting rotary motion according to claim 1, wherein the materials of said driving shaft (60) and of said driving thread, and the pitch of the threads of these two components define an irreversible thread.

3. A member for transmitting rotary motion according to claim 1, further comprising a handle (11) and an electric motor (12), and means for selectively coupling said control shaft (9) to one of said handle (11) and said electric motor (12).

4. A member for transmitting rotary motion according to claim 3, wherein said driving shaft and said driven shaft are at least partially enclosed and maintained in a frame (1) which is further enclosed in an outside support frame (35) and wherein at least a portion of the energy delivered by said driven shaft is used to displace a load, and said transmission member further includes a balancing mass fixed to said disk (61) with vertical displacement components of said load and of said balancing mass acting in opposite directions.

5. A member for transmitting rotary motion according to claim 4, further including a small column (15) extending inside said hollow shaft (60) and passing through said frame (1) and extending parallel to said shafts (60, 3) and being movable in translation, said column carrying a latch (22), said control shaft (9) being provided with a rod (25) extending perpendicularly thereto, and said member including means (61), (18), (19, 20, 21) for causing said rod (25) to come into abutment against said latch (22) when said disk (61) is a the end of its stroke.

6. A member for transmitting rotary motion according to claim 5, further comprising a movable control strip (3) said within support frame actuated by a handle (38), said handle having an end (54) operatively engagable with a switch (39) in said support frame, said control strip taking up three positions by movement thereof, in which:

at a first position, said switch (30) delivers a switch signal (40) for causing power to be applied to said electric motor (12), and said control strip prevents said handle (11) from being coupled to said control shaft (9);

at a second position, said switch (39) prevents power from being applied to said motor (12), and said control strip enables said handle (11) to be coupled to said control shaft (9); and at a third position, said switch prevents power from being applied to said motor (12), said control strip prevents said handle (11) from being coupled to said control shaft (9), and said control strip and said support frame further comprises means (48, 50) for locking said control slip in said third position.

7. A member for transmitting rotary motion according to claim 6, wherein said small column (15) terminates in a finger (23) which engages selectively holes (43, 44, 45) in said control strip, said finger (23) preventing said control strip from being moved unless said disk (61) is at the end of its stroke.

8. A member for transmitting rotary motion according to claim 4, further comprising a high end-of-stroke contact (27) and a low end-of-stroke contact (28) respectively mounted on said frame (1) and including means for delivering, respectively, a disk high signal (29) and a disk low signal (30) when actuated by said disk (61), and a control unit (31) mounted on said support frame (35) receiving said disk high signal (29) and said disk low signal (30), and a switch signal (40), and providing the energy required to operate said electric power (12) via a connection (59) for transmitting power and for defining the direction of motor rotation, upon the control unit also receiving a further control signal (58).

* * * * *